US009992481B2

(12) United States Patent
Lin et al.

(10) Patent No.: US 9,992,481 B2
(45) Date of Patent: Jun. 5, 2018

(54) METHOD AND APPARATUS FOR PROCESSING SURROUNDING IMAGES OF VEHICLE

(71) Applicant: VIA Technologies, Inc., New Taipei (TW)

(72) Inventors: Kuan-Ting Lin, New Taipei (TW); Yi-Jheng Wu, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 211 days.

(21) Appl. No.: 15/213,410

(22) Filed: Jul. 19, 2016

(65) Prior Publication Data
US 2017/0324948 A1    Nov. 9, 2017

(30) Foreign Application Priority Data
May 5, 2016  (TW) .............................. 105113922 A

(51) Int. Cl.
*H04N 7/00*    (2011.01)
*H04N 13/02*    (2006.01)
(Continued)

(52) U.S. Cl.
CPC ........... *H04N 13/0282* (2013.01); *B60R 1/00* (2013.01); *G06T 3/0062* (2013.01); *G06T 19/20* (2013.01);
(Continued)

(58) Field of Classification Search
CPC ............. H04N 13/0282; H04N 13/011; H04N 13/0018; H04N 13/0242; H04N 13/0246; B60R 1/00; B60R 2300/102; B60R 2300/105; B60R 2300/107; G06T 3/0062; G06T 19/20
(Continued)

(56) References Cited

U.S. PATENT DOCUMENTS 8,081,211 B2   12/2011   Chou et al.
8,150,210 B2    4/2012   Chen et al.
(Continued)

FOREIGN PATENT DOCUMENTS

TW      1320756      2/2010
TW      1361396      4/2012
(Continued)

OTHER PUBLICATIONS

"Office Action of Taiwan Counterpart Application," dated Jun. 5, 2017, p. 1-p. 4, in which the listed references were cited.

*Primary Examiner* — Michael Lee
(74) *Attorney, Agent, or Firm* — JCIPRNET

(57) ABSTRACT

A method and an apparatus for processing surrounding images of a vehicle are provided. In the method, plural cameras disposed on the vehicle are used to capture images of plural perspective views surrounding the vehicle. The images of the perspective views are transformed into images of a top view. An interval consisted of at least a preset number of consecutive empty pixels is found from one column of pixels in each image of the top view, and the images of the perspective views and the top view are divided into floor side images and wall side images according to the height of the interval in the image. The divided floor side images and wall side images are stitched to generate a synthetic image surrounding the vehicle.

20 Claims, 12 Drawing Sheets

(51) Int. Cl.
  *G06T 3/00* (2006.01)
  *G06T 19/20* (2011.01)
  *H04N 13/00* (2018.01)
  *B60R 1/00* (2006.01)

(52) U.S. Cl.
  CPC ..... *H04N 13/0011* (2013.01); *H04N 13/0018* (2013.01); *H04N 13/0242* (2013.01); *H04N 13/0246* (2013.01); *B60R 2300/102* (2013.01); *B60R 2300/105* (2013.01); *B60R 2300/107* (2013.01)

(58) Field of Classification Search
  USPC .......................................................... 348/48
  See application file for complete search history.

(56) References Cited

U.S. PATENT DOCUMENTS

| | | |
|---|---|---|
| 8,315,433 B2 | 11/2012 | Hsu et al. |
| 9,087,374 B2 | 7/2015 | Hsu et al. |
| 2011/0175752 A1* | 7/2011 | Augst ................... B60R 1/00 340/905 |
| 2014/0247352 A1* | 9/2014 | Rathi .................... B60R 1/00 348/148 |
| 2017/0324943 A1* | 11/2017 | Wu .................. H04N 13/0011 |
| 2017/0374340 A1* | 12/2017 | Pflug ...................... G06T 7/80 |

FOREIGN PATENT DOCUMENTS

| | | |
|---|---|---|
| TW | 1371382 | 9/2012 |
| TW | 1484449 | 5/2015 |

* cited by examiner

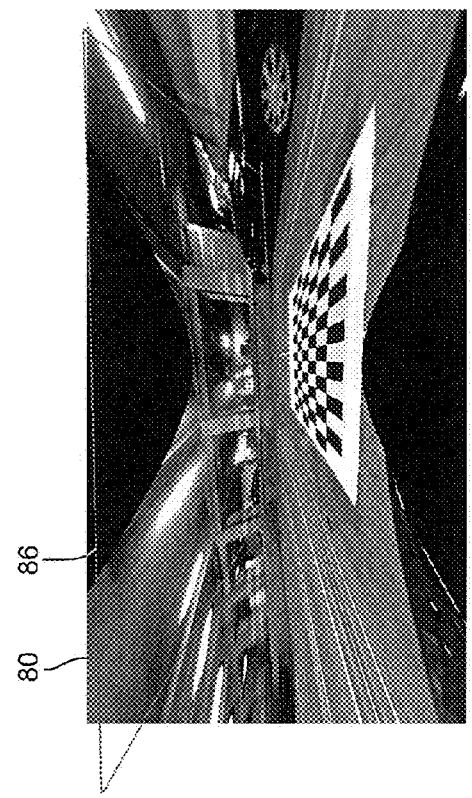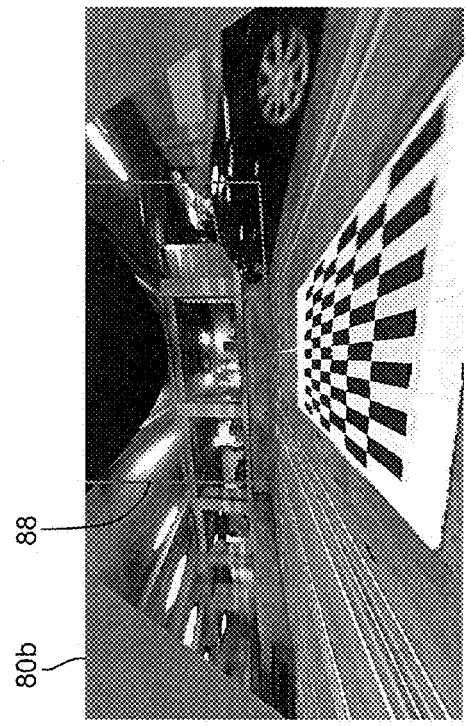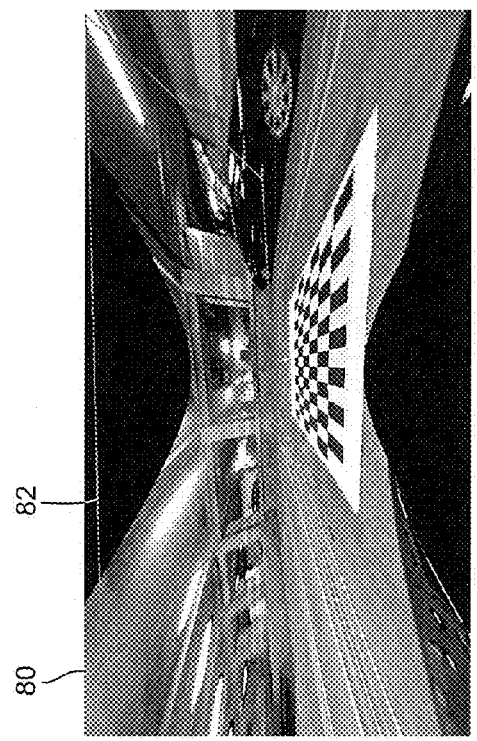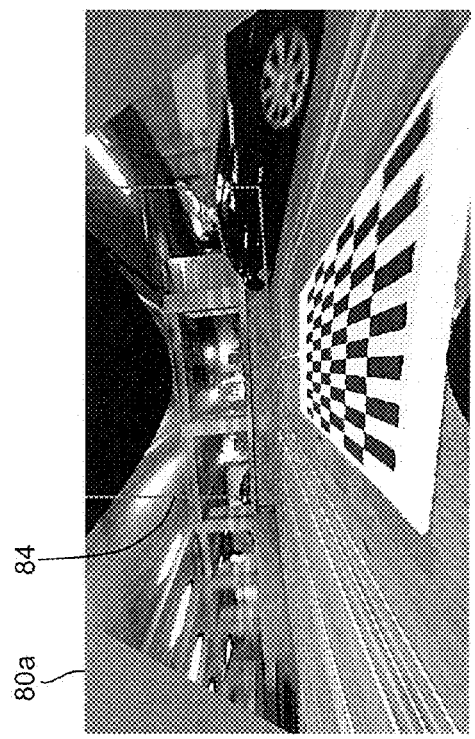
FIG. 8A
FIG. 8B

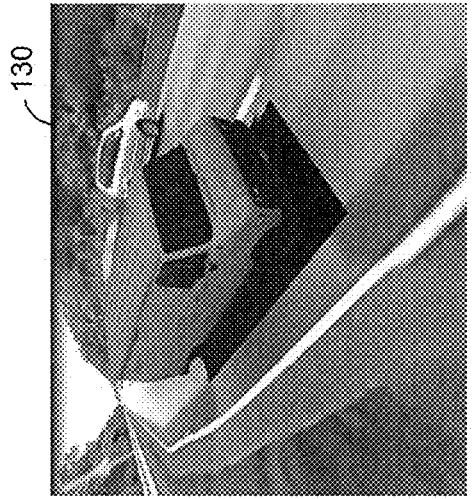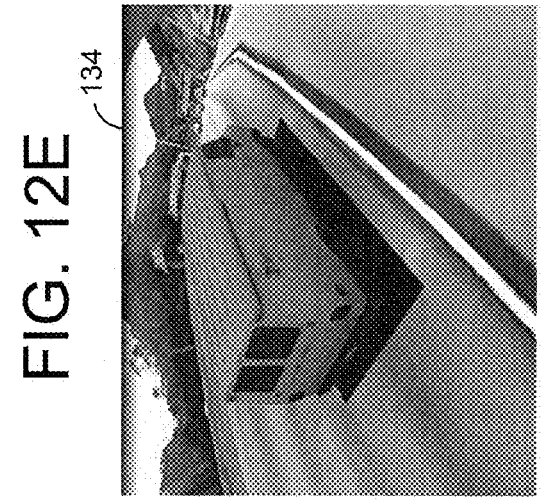
FIG. 12D  FIG. 12E  FIG. 12F  FIG. 12G

METHOD AND APPARATUS FOR PROCESSING SURROUNDING IMAGES OF VEHICLE

CROSS-REFERENCE TO RELATED APPLICATION

This application claims the priority benefit of Taiwan application serial no. 105113922, filed on May 5, 2016. The entirety of the above-mentioned patent application is hereby incorporated by reference herein and made a part of this specification.

BACKGROUND

Field of the Invention

The invention is directed to a method and an apparatus for processing images and more particularly, to a method and an apparatus for processing surrounding images of a vehicle.

Description of Related Art

A 360-degree vehicle around view monitoring (AVM) system captures images of four different directions around a vehicle by using four cameras equipped in front, rear, left, and right positions on the vehicle and thereby obtains a real surrounding image of the vehicle presented in a top view above the vehicle through processing the images including transforming, synthesizing, stitching the images, etc. The 360-degree surrounding image can assist a driver in clearly determining a relative position between the vehicle and a parking space or any other obstacle when parking or driving in narrow passages to avoid collision accidents.

Nevertheless, the current AVM system can only provide the top-view image of the surrounding of vehicle (including the vehicle and its surrounding scenery or obstacles) within a specific distance, but the top-view image cannot reflect actual appearance of the scenery or obstacles and is inconsistent with the scene actually viewed by the driver. Accordingly, it is necessary to develop an image processing method capable of not only providing the top-view image of the vehicle, but also providing clearer images of surrounding scenery so as to assist the driver in determining the relative position between the vehicle and the surrounding scenery more precisely.

SUMMARY

The invention provides a method and an apparatus for processing surrounding images of a vehicle, by which surrounding images and top-view images of the vehicle are adaptively divided into floor side images and wall side images, which are then adaptively combined and stitched, so as to generate an image capable of clearly revealing the scenery surrounding the vehicle.

According to an embodiment of the invention, a method for processing surrounding images of a vehicle applicable to an electronic apparatus disposed on a vehicle is provided. The electronic apparatus is coupled to a plurality of cameras disposed on the vehicle. In the method, images of a plurality of perspective views surrounding the vehicle are captured by using the cameras, and each of the images is transformed from the perspective view into a top view. Thereafter, an interval consisting of at least a preset number of consecutive empty pixels is found from one column of pixels in each of the transformed images of the top view, and the images of the perspective views and the top view are divided into floor side images and wall side images according to a height of the interval in the image. Lastly, the divided floor side images and wall side images are stitched to generate a synthetic image surrounding the vehicle.

According to an embodiment of the invention, an apparatus for processing images of a vehicle including a connection device, a storage device and a processor is provided. The connection device is configured to connect to a plurality of cameras disposed on the vehicle. The storage device is configured to store a plurality of modules. The processor is coupled with the connection device and the storage device and configured to load and execute the modules in the storage device. The modules include an image capturing module, a view transformation module, an image dividing module and an image stitching module. The image capturing module captures a plurality of images of perspective views surrounding the vehicle by using the cameras. The view transformation module transforms each of the images from the perspective view into a top view. The image dividing module finds an interval consisting of at least a preset number of consecutive empty pixels from one column of a plurality of constructive pixels in each of the transformed images of the top view, and divides the images of the perspective views and the top view into floor side images and wall side images according to the height of the interval in the image. The image stitching module stitches the divided floor side images and wall side images to generate a synthetic image surrounding the vehicle.

To sum up, in the method and the apparatus for processing the surrounding images of the vehicle of the invention, a plurality of images surrounding the vehicle are captured in different perspective views and transformed into the images of the top view, and the interval consisting of the consecutive empty pixels of the transformed images in a longitudinal direction is found. Thereby, the images are cropped, combined and stitched to obtain an adaptively processed synthetic image capable of clearly revealing the scenery surrounding the vehicle.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the present invention.

FIG. 8A and FIG. 8B illustrate examples of adjusting the wall side images according to an embodiment of the invention.

FIG. 12A to FIG. 12G illustrate an example of displaying the images surrounding the vehicle according to an embodiment of the invention.

DESCRIPTION OF EMBODIMENTS

For perspective-view images of a vehicle captured by cameras of an around view monitoring (AVM) system, an apparatus of the invention can not only transform them into top-view images capable of assisting parking, but also determine a dividing line for dividing clear floor side images by utilizing an empty pixel distribution of the transformed images. The images before and after being transformed are divided by the dividing line, and the floor side images in the top-view images and wall side images in the perspective-view images are combined to obtain combined images with clear floor side and wall side images. Lastly, the combined images of each view are stitched, so as to obtain a synthetic image capable of clearly revealing the ground and scenery surrounding the vehicle. In addition, by mapping the synthetic image to a three-dimensional (3D) model of a space surrounding the vehicle, the apparatus of the invention can also provide an image suitable for a user to view instantly according to the user's demand or actuation manners of the vehicle.

Figure 1:
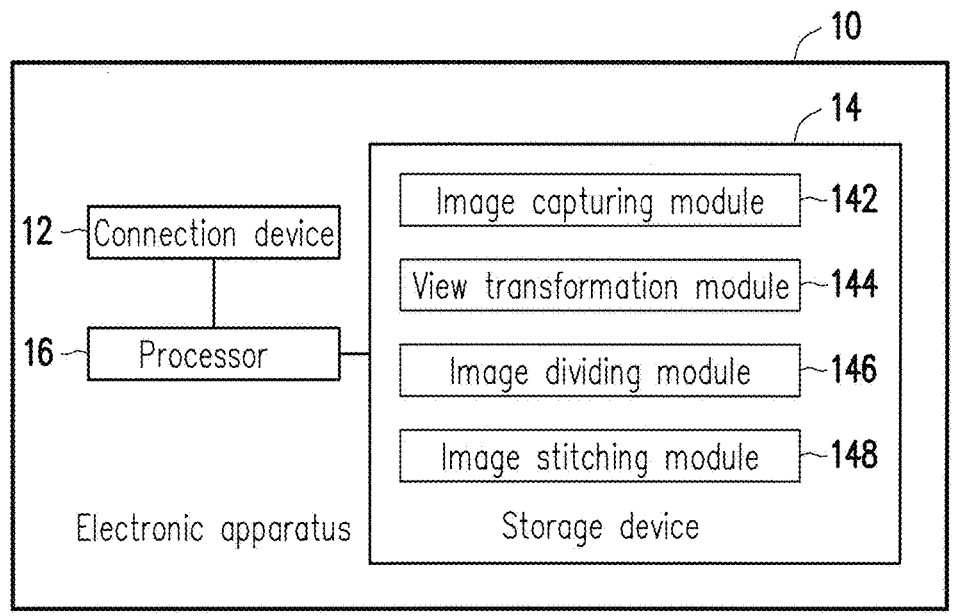
FIG. 1 is a block diagram illustrating an apparatus for processing images surrounding a vehicle according to an embodiment of the invention.

FIG. 1 is a block diagram illustrating an apparatus for processing images surrounding a vehicle according to an embodiment of the invention. An electronic apparatus 10 illustrated in FIG. 1 is taken as an example of an apparatus for processing images surrounding a vehicle in the present embodiment, which is, for example, a car computer, or a cell phone, a tablet computer, a personal computer (PC) or any other apparatus having a computing function. The electronic apparatus 10 includes a connection device 12, a storage device 14 and a processor 16 and functions thereof will be described in the following.

The connection device 12 is, for example, a wired or a wireless transmission interface in compliance with the universal serial bus (USB), the RS232, the Bluetooth or the wireless fidelity (Wi-Fi) standard and is configured to connect cameras disposed on the vehicle to receive image captured by the cameras.

The storage unit 14 is, for example, any type of fixed or movable random access memory (RAM), read only memory (ROM), flash memory, the like or a combination of the aforementioned elements. In the present embodiment, the storage device 14 is configured to record an image capturing module 142, a view transformation module 144, an image dividing module 146 and an image stitching module 148.

The processor 16 may be a central processing unit (CPU) or any other programmable microprocessor for general or special use, a digital signal processor (DSP), a programmable controller, an application specific integrated circuit (ASIC), a programmable logic device (PLD) or other similar devices, or a combination of these devices, which is connected with the connection device 12 and the storage device 14.

In the present embodiment, the modules stored in the storage device 14 are, for example, computer programs and may be loaded by the processor 16, so as to perform a method for processing images surrounding the vehicle of the present embodiment. An embodiment is provided hereinafter to illustrate detailed steps of the method.

Figure 2:
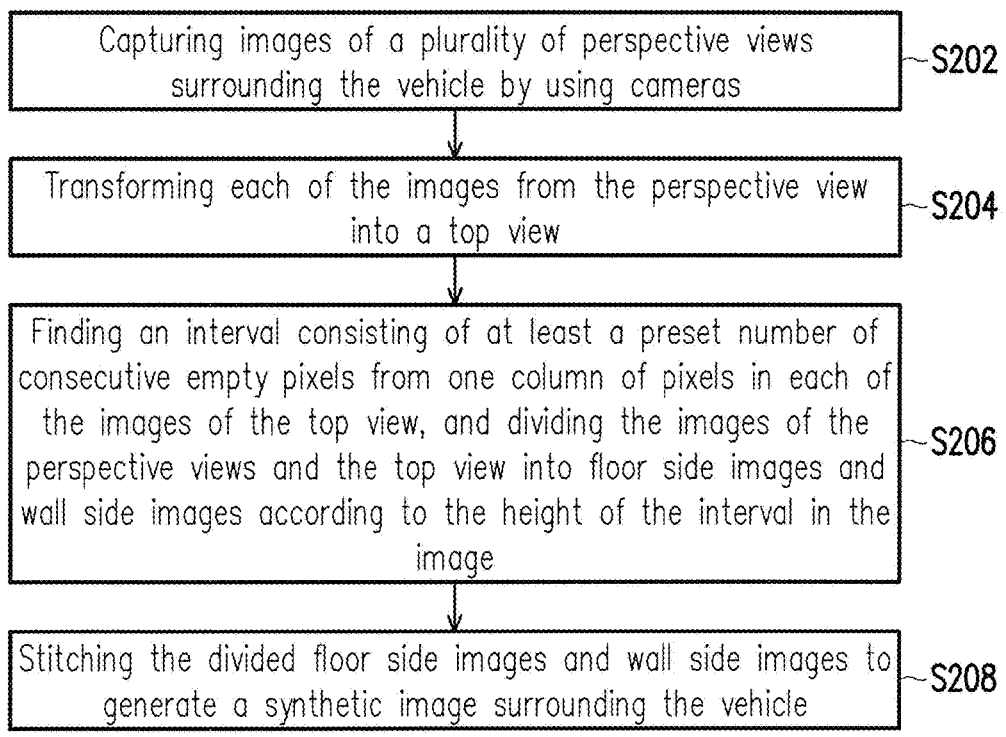
FIG. 2 is a flowchart illustrating a method for processing images surrounding a vehicle according to an embodiment of the invention.

FIG. 2 is a flowchart illustrating a method for processing images surrounding a vehicle according to an embodiment of the invention. Referring to FIG. 1 and FIG. 2, the method of the present embodiment is applicable to the electronic apparatus 10 illustrated in FIG. 1, and detailed steps of the method for processing images surrounding a vehicle of the present embodiment will be described with reference to each element of the electronic apparatus 10 depicted in FIG. 1.

First, the image capturing module 142 captures a plurality of images of perspective views surrounding the vehicle by using cameras connected via the connection device 12 (step S202). The aforementioned cameras may include cameras disposed in front, rear, left and right positions on the vehicle and configured to capture images of perspective views of front, rear, left and right of the vehicle, but the invention is not limited thereto. A person skilled in the art may additionally dispose cameras in other positions on the vehicle depending on actual needs so as to increase the coverage of the captured images.

Figure 3:
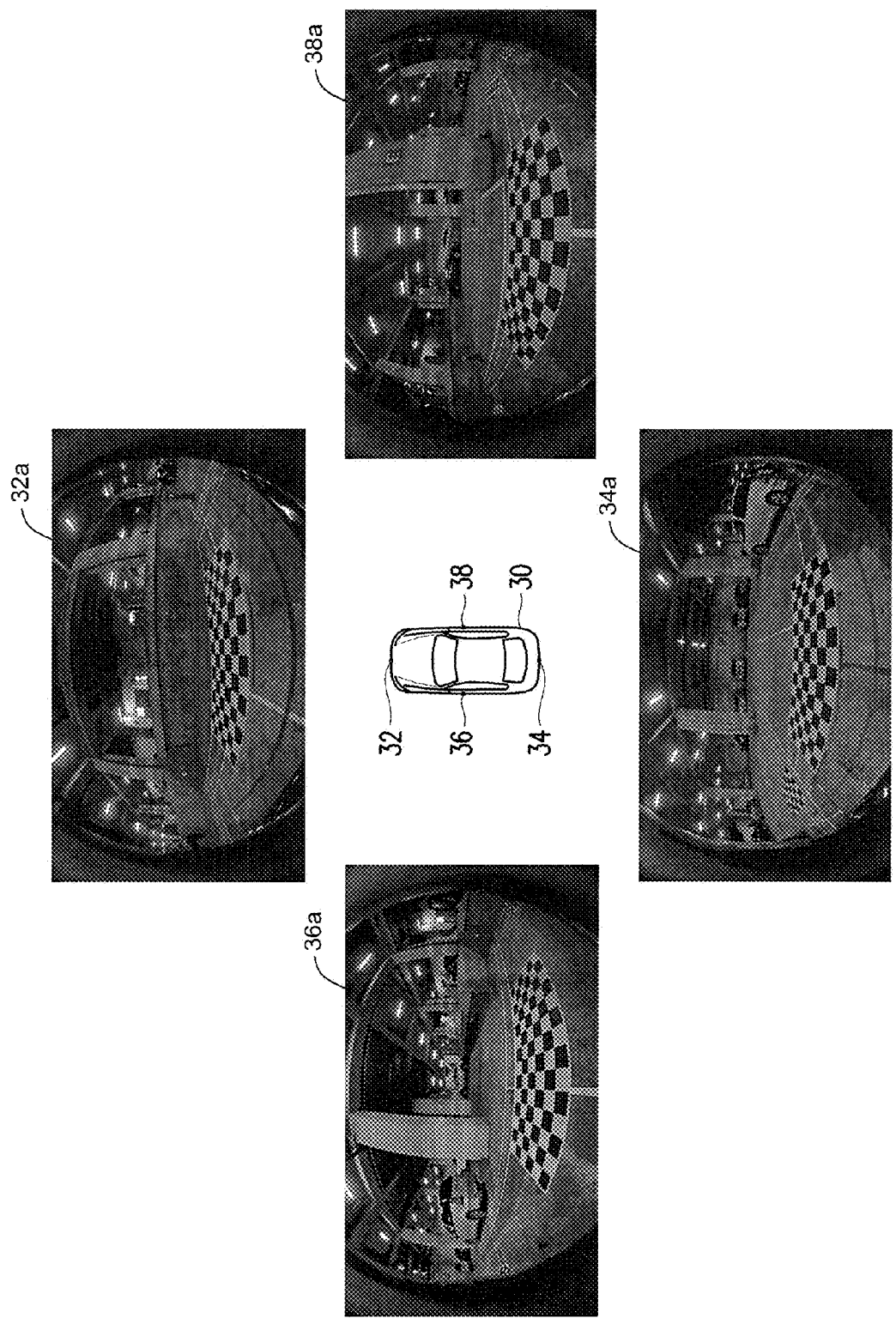
FIG. 3 illustrates an example of capturing images surrounding a vehicle according to an embodiment of the invention.

For example, FIG. 3 illustrates an example of capturing images surrounding a vehicle according to an embodiment of the invention. Referring to FIG. 3, cameras 32, 34, 36 and 38 are disposed in front, rear, left and right positions on a vehicle 30 in the present embodiment. The cameras 32, 34, 36 and 38 are configured to capture images 32a, 34a, 36a and 38a of perspective views of front, rear, left and right of the vehicle.

It should be mentioned that in the above embodiment, the cameras disposed on the vehicle use, for example, fisheye lenses with a viewing angle nearly 180 degrees and are capable of capturing images with a wider coverage. Due to the images captured by using the fisheye lenses having deformation (e.g., circular distortions appearing in the images 32a, 34a, 36a and 38a), the processor 160 may additionally execute a fisheye calibration module (not shown) in the present embodiment, so as to perform fisheye calibration on the images.

The fisheye calibration module may crop the images captured by the cameras according to lens parameters, such as a focal length, a viewing angle, a center resolution, an edge resolution, of each camera, so as to move the center of a fisheye lens to an image center. Specifically, a scene captured by a fisheye lens only appears in a circular area around a center of the image and surrounded by black rims. If the left and the right black rims have different widths, it indicates that the lens center deviates from the image center. In this case, the fisheye calibration module, for example, crops the image, such that the widths of the black rims at two sides of the image are consistent, and the center of the fisheye lens moves to the image center to ensure the image can be restored back to its original shape when the fisheye calibration is subsequently performed.

After the image center is calibrated, the fisheye calibration module also performs the fisheye calibration on the images captured by the cameras according to the lens parameters of each camera, so as to calibrate each image from the center of the image toward the peripheral of the image. Thereby, the previously distorted image can be restored back to the original shape of the captured scene.

Specifically, it is assumed that a captured fisheye image has a width dw and a height dh, and a source image after calibration has a width sw and a height sh; it is assumed that (dx, dy) represents a pixel position of the fisheye image before calibration, and (sx,sy) represents a pixel position of a source image after calibration; and it is assumed that a de-fish coefficient of the fisheye lens is f. Therein, a relation equation of a distance (rx, ry) between the pixel position (dx, dy) and the image center (dw/2, dh/2) is:

$$(rx, ry) = \left(dx - \frac{dw}{2}, dy - \frac{dh}{2}\right).$$

The pixel position (sx, sy) of the source image after calibration (i.e., the de-fish image) is:

$$(sx, sy) = \left(\frac{sw}{2} + \theta \times rx, \frac{sh}{2} + \theta \times ry\right),$$

wherein $$\theta = \begin{cases} 1, & \text{if } r = 0 \\ \frac{\tan^{-1} r}{r}, & \text{if } r \neq 0 \end{cases},$$

wherein $$r = \frac{d(rx, ry)}{d(sw, sh)/f},$$

and d(i, j) represents the Euclidean distance. In another embodiment, if the cameras disposed on the vehicle do not use the fisheye lenses, the fisheye calibration may not be performed, or other types of calibration corresponding to the camera lenses may be performed.

Figure 4:
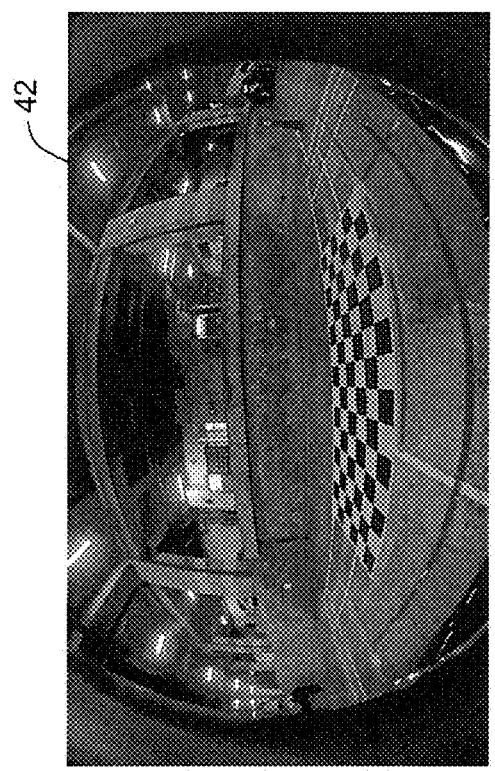
FIG. 4 illustrates an example of fisheye calibration according to an embodiment of the invention.
Figure 4:
Figure 4:
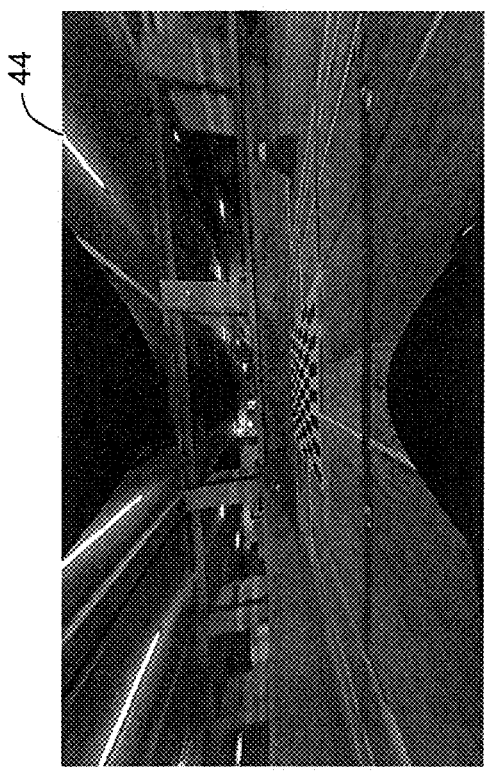

For example, FIG. 4 illustrates an example of fisheye calibration according to an embodiment of the invention. Referring to FIG. 4, in the present embodiment, the fisheye calibration is performed on a fisheye image 42 captured by the camera disposed on the front of a vehicle using a fisheye lens. Pixel positions in the fisheye image 42 may be transformed into corresponding positions in a de-fish image 44 through the aforementioned equation, so as to obtain the de-fish image 44 with no distortion. Due to limitation of the fisheye lens, black rims appear in the upper middle and the lower middle of the de-fish image 44.

Then, the view transformation module 144 transforms each of the images from the perspective view into a top view (step S204). The view transformation module 144 transforms positions of a plurality of pixels in each perspective-view image into corresponding positions in the top-view image by using, for example, a pre-built transformation matrix.

Regarding the transformation matrix, the view transformation module 144 uses, for example, the cameras to capture a first image of a perspective view including a reference object (e.g., a positioning grid or pattern drawn on the floor), and uses another independent camera disposed above the reference object to capture a second image of a top view containing the reference object. Thereafter, the view transformation module fetches positions of a plurality of pixels of the reference object in the first image to serve as destination positions, and fetches positions of a plurality of corresponding pixels of the reference object in the second image to serve as source positions, so as to solve a plurality of transformation coefficients in a transformation matrix.

For example, it is assumed that (xi, yj) represents a pixel position in a source image (i.e., the second image of the top view), (ui, vj) represents a pixel position in a destination image (i.e., the first image of the perspective view). Four predetermined pixels fetched from the source image and four predetermined corresponding pixels fetched from the destination image are substituted into the following equation:

$$\begin{bmatrix} x0 & y0 & 1 & 0 & 0 & 0 & -x0 \times u0 & -y0 \times u0 \\ x1 & y1 & 1 & 0 & 0 & 0 & -x1 \times u1 & -y1 \times u1 \\ x2 & y2 & 1 & 0 & 0 & 0 & -x2 \times u2 & -y2 \times u2 \\ x3 & y3 & 1 & 0 & 0 & 0 & -x3 \times u3 & -y3 \times u3 \\ 0 & 0 & 0 & x0 & y0 & 1 & -x0 \times v0 & -y0 \times v0 \\ 0 & 0 & 0 & x1 & y1 & 1 & -x1 \times v1 & -y1 \times v1 \\ 0 & 0 & 0 & x2 & y2 & 1 & -x2 \times v2 & -y2 \times v2 \\ 0 & 0 & 0 & x3 & y3 & 1 & -x3 \times v3 & -y3 \times v3 \end{bmatrix} \cdot \begin{bmatrix} C_{00} \\ C_{01} \\ C_{02} \\ C_{10} \\ C_{11} \\ C_{12} \\ C_{20} \\ C_{21} \end{bmatrix} = \begin{bmatrix} u0 \\ u1 \\ u2 \\ u3 \\ v0 \\ v1 \\ v2 \\ v3 \end{bmatrix}.$$

A corresponding 3×3 matrix C may be obtained by solving coefficients $C_{ij}$ (where i,j=0 to 2, and wherein $C_{22}=1$) in the above linear system, such that the transformation matrix used for transforming perspective-view images into the top-view images in the present embodiment may be obtained by calculating an inverse matrix of the matrix C. After the transformation matrix used for transforming perspective-view images into the top-view images is obtained, vectors (ui,vi,1) corresponding to the pixels of the perspective-view images captured by the cameras of the vehicle are multiplied by the transformation matrix to obtain vectors (xi, yi,1) corresponding to the pixels of the top-view images. Although the transformation matrix is calculated by using four pixels in the present embodiment, the transformation matrix may also be calculated by using any other number of pixels in other embodiments. In an embodiment, the images captured by the cameras in different positions on the vehicle may be transformed by using the same or different transformation matrices so as to cope with angles and lens parameters of the cameras. In an embodiment, a mapping table with respect to the pixels of each perspective-view image mapping to the pixels of each top-view image may be built in advance according to the aforesaid transformation matrix, and then, the images are transformed by looking up the table.

Back to the flow illustrated in FIG. 2, after the transformed top-view images are obtained, the image dividing module 146 finds an interval consisting of at least a preset number of consecutive empty pixels from one column of pixels in each of the transformed top-view images, and divides the perspective-view images and the top-view images into floor side images and wall side images according to the height of the interval in the image (step S206). The aforementioned one column of pixels may refer to, for example, a column of pixels on a mid-line of the image or a column of pixels on a specific object in the image, and the preset number is, for example, 10 or any other number determined according to image parameters such as the resolution, which is not limited in the invention.

In detail, data of pixels in the image after being transformed from the perspective view into the top view concentrates in a lower portion of the image (i.e., a floor side image), and the number of pixels with data decreases gradually with the increase of the height of the image (i.e., the increase in the distance to the bottom of the image). Thus, many empty pixels with no image data are left in the top-view image, and the empty pixels increase with the increase of the height of the image.

Therefore, in the present embodiment, a preset value with respect to aforesaid number is set for the distribution of the empty pixels. If the number of the consecutive empty pixels of the top-view image in a vertical direction is over the preset value, it indicates that too many empty pixels exist in the image above the interval, which results in image distortion. Accordingly, the image dividing module 146 divides the images of the perspective views and the top view into floor side images and wall side images according to the height of the interval in the image, so as to preserve the clear floor side images. The image dividing module 146 determines a position of the dividing line by using, for example, the height of the mid-point of the interval, or the height of a pixel having image data located on the upper end or the lower end of the interval.

Figure 5:
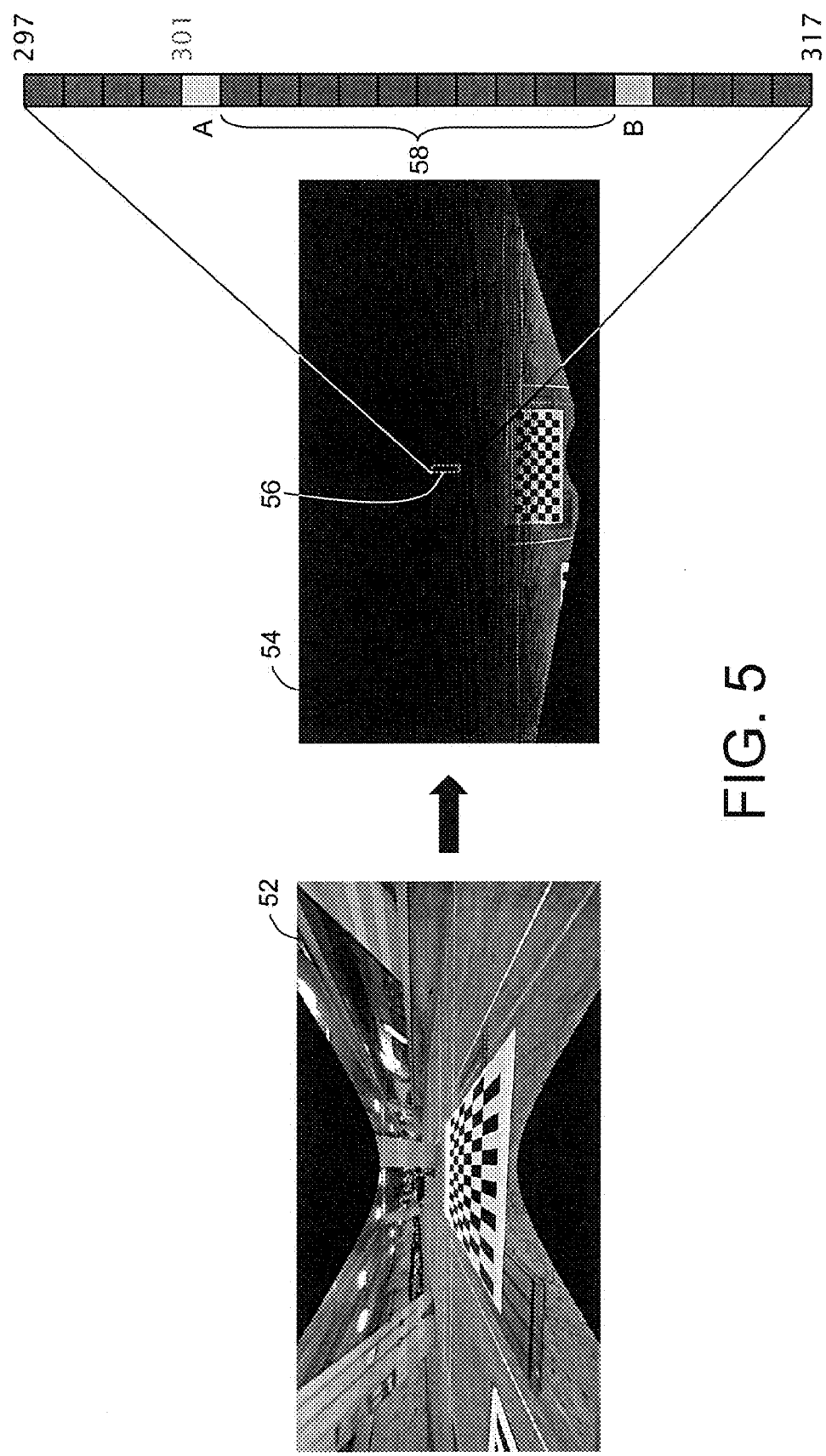
FIG. 5 illustrates an example of the method for processing images surrounding the vehicle according to an embodiment of the invention.

For example, FIG. 5 illustrates an example of the method for processing images surrounding the vehicle according to an embodiment of the invention. Referring to FIG. 5, an image 52 is a left image of a vehicle after fisheye calibration, and a viewing angle of the image 52 is transformed into a top viewing angle to obtain an image 54. According to the image 54, image data mainly concentrates in a floor side image, and empty pixels (black areas between horizontal lines in the upper portion of the image) gradually increase with the increase of the height of the image. Accordingly, in the present invention, a column of pixels 56 on a mid-line of the image 54 are fetched to determine a position of a dividing line for dividing the image 54. Referring to the enlarged illustration of the column of pixels 56 at the right side of the image 54, the column of pixels 56 includes a plurality of pixels having heights from 297 to 317, wherein pixels A and B have image data, and the rest of the pixels are empty pixels having no image data. Considering that the number of the empty pixels reaches 10, the invention utilizes an interval 58 formed by the empty pixels to determine the position of the dividing line for dividing the image 54. Therein, the invention may employ the height of the mid-point of the interval 58 in the image 54 or the height of one of the pixels A or B in the image 54 as the height of the dividing line.

Back to the process illustrated in FIG. 2, after the images of the perspective views and the top view are divided into the floor side images and the wall side images, the image stitching module 148 stitches the divided floor side images and the wall side images to generate a synthetic image surrounding the vehicle (step S208). The image stitching module 148, for example, combines clear images of the floor side and the wall side of the same view, and then stitches the combined images of neighboring views, and adaptively adjusts the heights of the wall side images, such that the heights of the wall side images in the combined images are consistent. Lastly, a synthetic image surrounding the vehicle in 360 degrees is generated.

Figure 6:
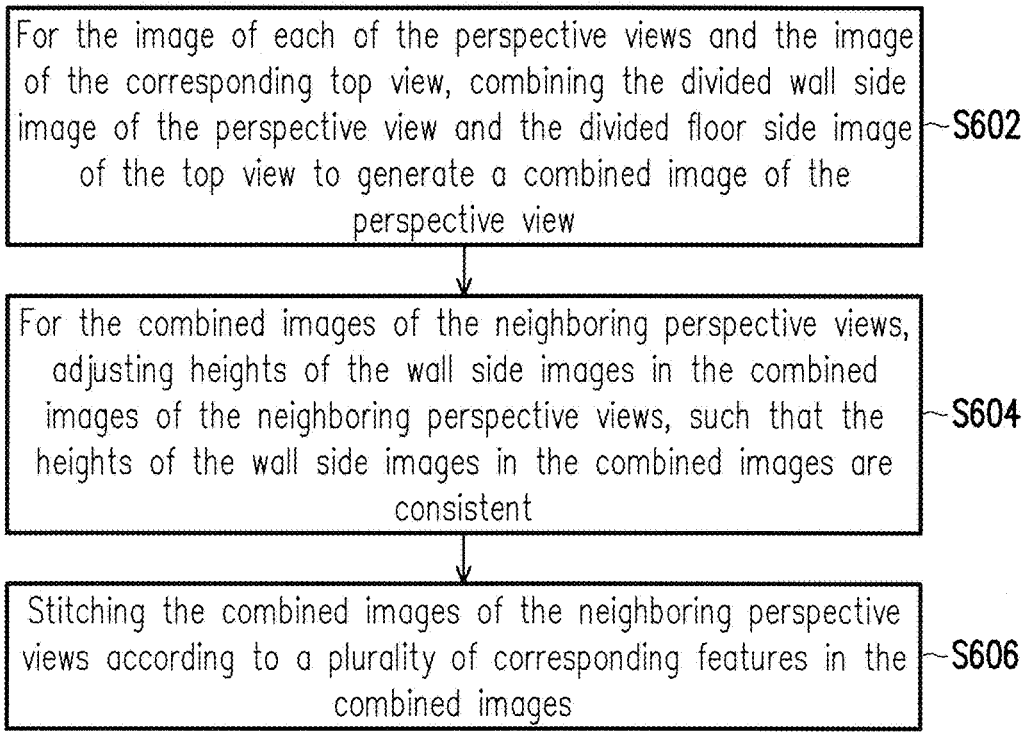
FIG. 6 is a flowchart illustrating a method for stitching images of different views to obtain a synthetic image surrounding the vehicle according to an embodiment of the invention.

Specifically, FIG. 6 is a flowchart illustrating a method for stitching images of different views to obtain a synthetic image surrounding the vehicle according to an embodiment of the invention. Referring to FIG. 1 and FIG. 6 simultaneously, the method of the present embodiment is applicable to the electronic apparatus 10 illustrated in FIG. 1, and detailed steps of the method for stitching the images of the present embodiment will be described with reference to each element of the electronic apparatus 10 depicted in FIG. 1.

First, for the image of each of the perspective views and the image of the corresponding top view, the image stitching module 148 combines the divided wall side image of the perspective view and the divided floor side image of the top view to generate a combined image of the perspective view (step S602). Since the floor side image of the top view is clear and close to a real image, and the wall side image of the perspective view is clear and close to a real image, the image stitching module 148 may obtain a combined image including clear floor side and wall side images and close to the real image after combining the two types of images.

Figure 7:
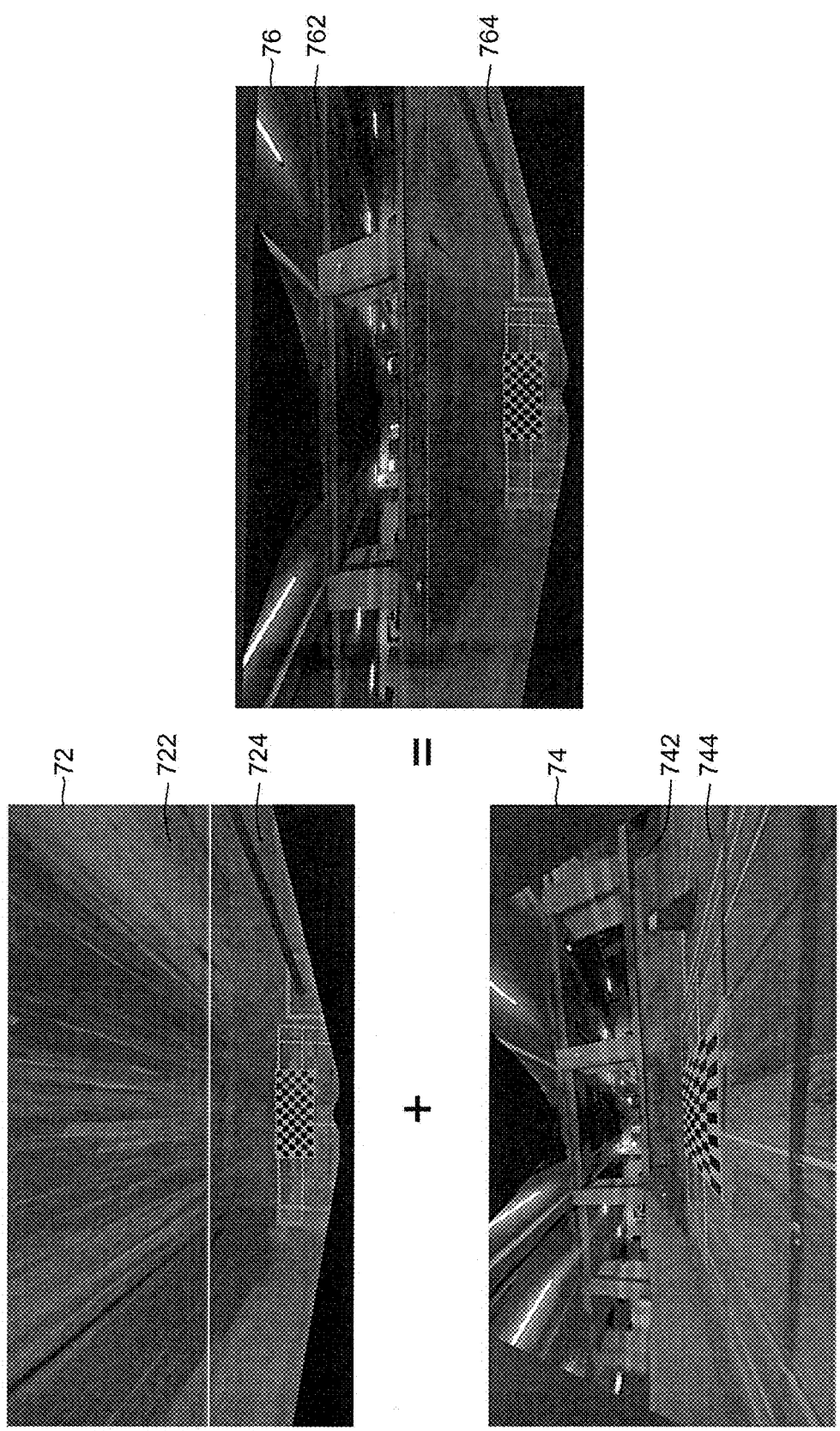
FIG. 7 illustrates an example of combining the wall side images of the perspective views and the floor side images of the top view according to an embodiment of the invention.

For example, FIG. 7 illustrates an example of combining the wall side image of the perspective view and the floor side image of the top view according to an embodiment of the invention. Referring to FIG. 7, an image 74 is a perspective-view image obtained by performing fisheye calibration on an image captured by a camera disposed in the front of a vehicle, and an image 72 is a top-view image obtained by performing view transformation on the image 74. Based on the method of determining the dividing line described in the embodiment above, a dividing line suitable for dividing the images 72 and 74 is obtained. By using the dividing line, the top-view image 72 is divided into a wall side image 722 and a floor side image 724, and the perspective-view image 74 is divided into a wall side image 742 and a floor side image 744. Accordingly, in the present embodiment, the floor side image 724 of the top-view image 72 and the wall side image 742 of the perspective-view image 74 with more clearness are combined to obtain a combined image 76. Therein, in the present embodiment, when the floor side image 724 and the wall side image 742 are combined, the floor side image 724 and the wall side image 742 may be further zoomed according to corresponding features (which are recognized through, for example, a conventional image recognition method) in the floor side image 724 and the wall side image 742 to obtain a floor side image 764 and a wall side image 762 with corresponding positions. The wall side image 762 of the present embodiment is obtained by zooming the wall side image 742.

It should be mentioned that the wall side image of the present embodiment is obtained from the perspective-view image after fisheye calibration; however, even through the fisheye calibration, objects in the wall side image of the perspective-view image may still have skews, and the farther away from the mid-line of the image, the more obvious the skews. As such, in the present embodiment, before the wall side image and the floor side image are combined, a skew adjustment may be further performed on the wall side image such that the objects in the adjusted wall side images can be aligned.

For example, FIG. 8A and FIG. 8B illustrate an example of adjusting the wall side images according to an embodiment of the invention. Referring to FIG. 8A, an image 80 is a perspective-view image obtained by performing fisheye calibration on an image captured by a camera disposed in the front of a vehicle. In the present embodiment, positions of pixels in an area 82 of the image 80 are fetched to serve as source positions, and the area 82 is preset to be transformed into an area 84, such that skewed objects in the area 82 are adjusted to align with each other after the area 82 is transformed into the area 84.

According to pillars appearing in a transformed image 80a, the pillars still appear to skew leftwards in the transformed image 80a. Accordingly, the area 82 of the pixels fetched for transformation is adjusted to be an area 86 in the present embodiment, i.e., the area of the fetched pixels is expanded leftward, and a transformed area 88 is preset, wherein the area 88 and the area 84 have the same size and shape. According to pillars appearing in a transformed image 80b, the pillars in the transformed image 80b are aligned with one another and in consistence with an axial (vertical) direction of the image. The issue of the objects skewing in the wall side image of the perspective-view image may be solved by the adjustment described above.

Back to the process illustrated in FIG. 6, the image stitching module 148 then adjusts heights of the wall side images in the combined images of the neighboring perspective views, such that the heights of the wall side images in the combined images are consistent (step S604). Specifically, since the neighboring perspective views may overlap, partial areas in the neighboring perspective views overlap; however, due to the difference of view directions, heights of the overlapping areas are not always the same. If the neighboring perspective-view images are directly stitched together, the aforementioned issue of inconsistent heights may lead to discontinuity of the stitched image. Accordingly, in the present embodiment, corresponding features in the combined images of the neighboring perspective views are compared, so as to adjust the heights of the combined images to be consistent with each other.

Figure 9:
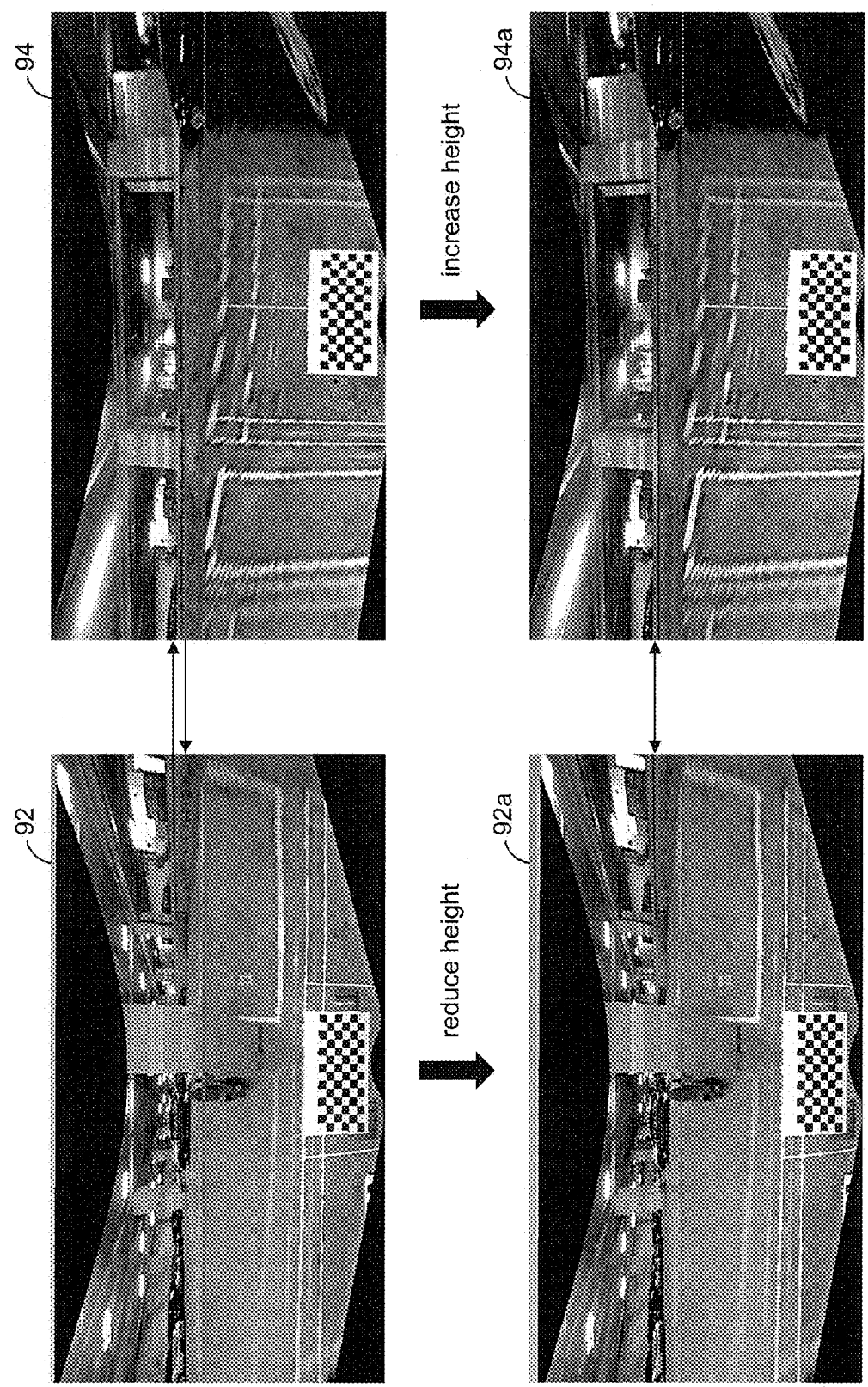
FIG. 9 illustrates an example of adjusting a height of the wall side images according to an embodiment of the invention.

For example, FIG. 9 illustrates an example of adjusting the height of the wall side image according to an embodiment of the invention. Referring to FIG. 9, an image 92 is a combined image of a left perspective view obtained by performing the fisheye calibration, dividing and combining set forth in the above embodiment on an image captured by a camera disposed on the left of a vehicle, and an image 94 is a combined image of a front perspective view obtained by performing the fisheye calibration, dividing and combining set forth in the above embodiment on an image captured by a camera disposed on the front of a vehicle. According to upper areas in the images 92 and 94, walls thereof overlap. However, a wall height (referring to the arrow pointing to the right) in the image 92 appears to be higher than a wall height (referring to the arrow pointing to the left) of the image 94, and thus, if the images 92 and 94 are directly combined, inconsistence of the wall heights will occur. As such, the adjustment method described in FIG. 8A and FIG. 8B is utilized in the present embodiment to reduce the height of the wall side image in the image 92 (which is equivalent to reduce the wall height) to obtained an adjusted image 92a, and increase the wall side image in the image 94 (which is equivalent to increase the wall height) to obtained an adjusted image 94a. As the wall heights in the adjusted images 92a and 94a are the same, the wall heights are consistent even when the images 92 and 94 are combined, without encountering the aforementioned discontinuous issue. The adjusted images may be used to build another transformation matrix in the same way as described above, and thereby, the adjustment for the wall side images of the perspective views can be completed by multiplying the transformation matrix. In another embodiment, in the same way as the method described above, the cameras are used to capture wall side images containing a reference object (e.g., a positioning grid or pattern drawn on the wall) and another independent camera disposed in front of the reference object is used to capture a real wall side image containing the same reference object, so as to solve a transformation matrix of the wall side images in the same way.

Lastly, the image stitching module 148 stitches the combined images according to a plurality of corresponding features in the combined images of the neighboring perspective views (step S606). The aforementioned corresponding features refer to, for example, object features that appear in both of the two combined images of the neighboring perspective views. The image stitching module 148, for example, first rotates front, rear, left, and right images of the vehicle according to the direction of the vehicle, and then translates and/or zooms the combined images according to the object features in the combined images, such that the combined images are stitched as a synthetic image.

Figure 10:
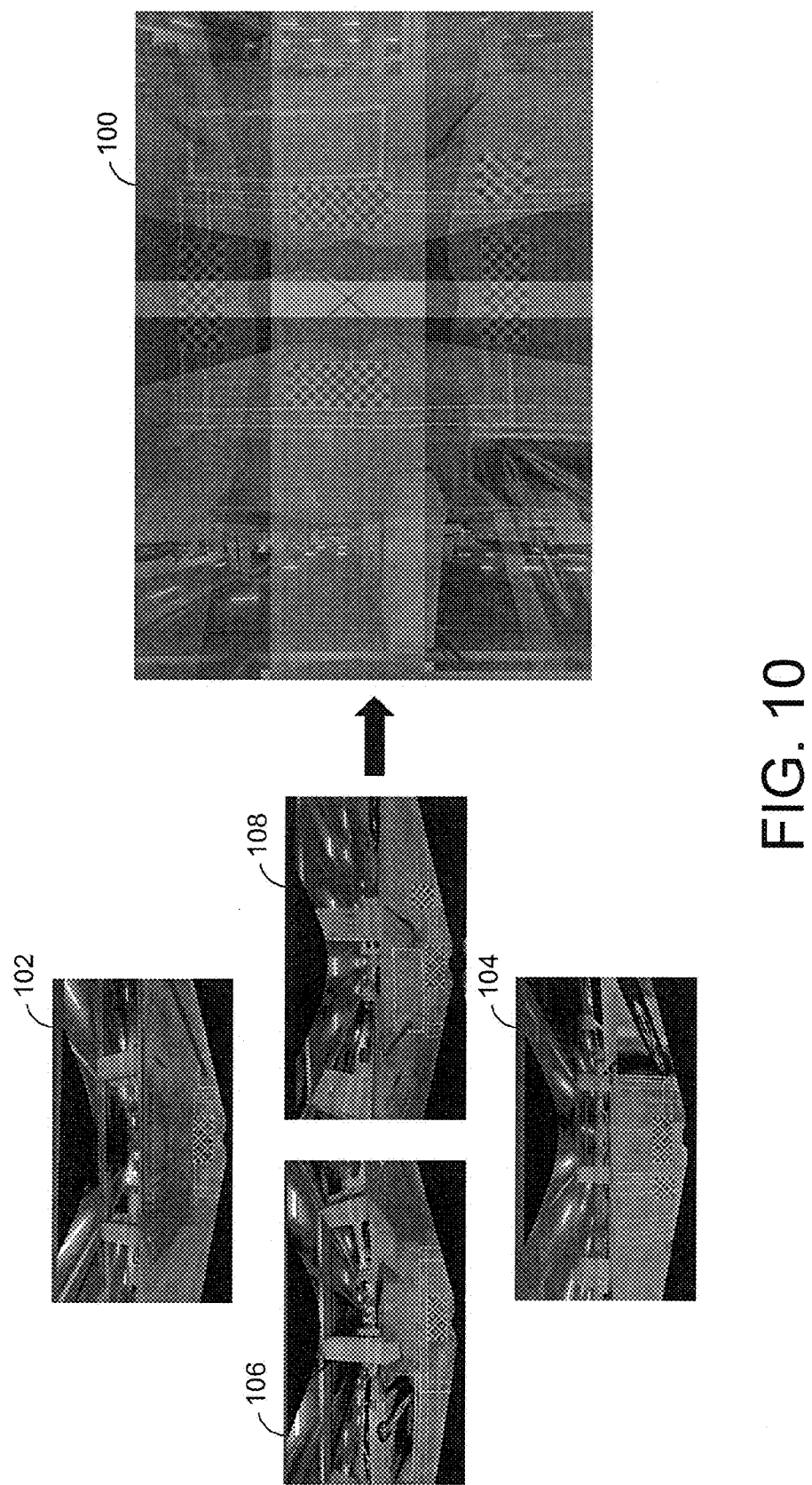
FIG. 10 illustrates an example of stitching the combined images according to an embodiment of the invention.

For example, FIG. 10 illustrates an example of stitching the combined images according to an embodiment of the invention. Images 102, 104, 106, and 108 shown in the left of FIG. 10 are combined images of the front, rear, left, and right of a vehicle, respectively. During the process of stitching, except for the image 102 of the front of the vehicle being maintained in the original direction, the image of the left of the vehicle rotates 90 degrees counterclockwise, the image of the right of the vehicle rotates 90 degrees clockwise, and the image of the rear of the vehicle rotates 180 degrees. Due to objects, such as pillars, parking lot lines, or lamps, appearing in the images 102, 104, 106, and 108, the apparatus of the present embodiment stitches the rotated images 102, 104, 106, and 108 according to positions and sizes of the same objects, so as to obtain a synthetic image 100 including the ground and scenery surrounding the vehicle. Transformation matrices corresponding to the stitched images including the font, the rear, the left, and the right of the vehicle may be built based on the aforementioned method to complete the image stitching operation.

On the basis that the synthetic image surrounding the vehicle stitched by the image stitching module 148 includes clear wall side images and floor side images in various directions surrounding the vehicle, in another embodiment, the invention further introduces that the processor 16 executes a three-dimensional (3D) model module, so as to map the clear synthetic image to a 3D model of the space surrounding the vehicle. Thereby, when receiving a viewing demand for the surrounding image of the vehicle, the electronic apparatus 10 may provide a surrounding image in a viewing angle by using the 3D model according to the viewing angle in the viewing demand.

Figure 11:
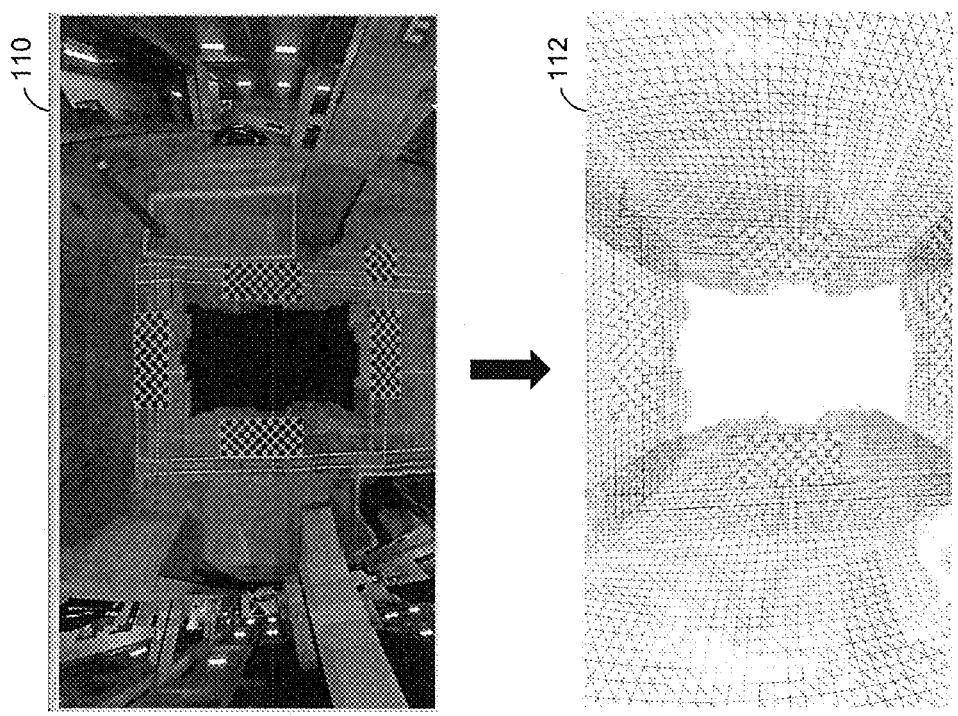
FIG. 11 illustrates an example of building a three dimensional (3D) model according to an embodiment of the invention.

For example, FIG. 11 illustrates an example of building a 3D model according to an embodiment of the invention. An image 110 illustrated in FIG. 11 is a synthetic image surrounding a vehicle generated by the method for processing the surrounding images of the vehicle described in the embodiments above. The apparatus of the present embodiment, for example, builds a 3D model 112 of the space surrounding the vehicle, such that each pixel in the image 110 is mapped to a corresponding position in the 3D model 112. It should be mentioned that the image 110 of the present embodiment is obtained by processing images captured by cameras disposed in front, rear, left, and right positions on the vehicle, and thus, when the image 110 is mapped to the 3D model 112, each pixel in the combined images of perspective-view images captured by the front, the rear, the left, and the right cameras of the vehicle is mapped to one pixel in the 3D model. Accordingly, the apparatus of the present embodiment may find corresponding positions in the 3D model for the pixels in the images captured by the four cameras, so as to build a corresponding table. In this way, whenever receiving images captured by the four cameras, the apparatus of the present embodiment may transform the pixels in the images into corresponding positions in the 3D model by looking up the table, so as to quickly build the 3D model of the space surrounding the vehicle. In the embodiment illustrated in FIG. 11, planes respectively corresponding to the front, the rear, the left, and the right images of the vehicle in the 3D model 112 are connected with one another in an approximately perpendicular manner. In other embodiments, each of the planes may be connected with one another at other angles or in a manner of curved surfaces.

After the 3D model is built, the surrounding images of the vehicle in different angles may be provided by the apparatus of the present embodiment using the 3D model according to the viewing demand and serve as a reference for a driver to drive the vehicle. In an embodiment, the viewing demand is determined according to, for example, a viewing angle or a viewing mode selected on the apparatus by a user. In another embodiment, the viewing demand may also be determined according to the actuation of the vehicle. For instance, when the vehicle is driven in reverse, the surrounding image of rear of the vehicle is automatically displayed, and when the vehicle turns left, the surrounding image of left front of the vehicle is automatically displayed, which is not limited in the invention.

Figure 12C:
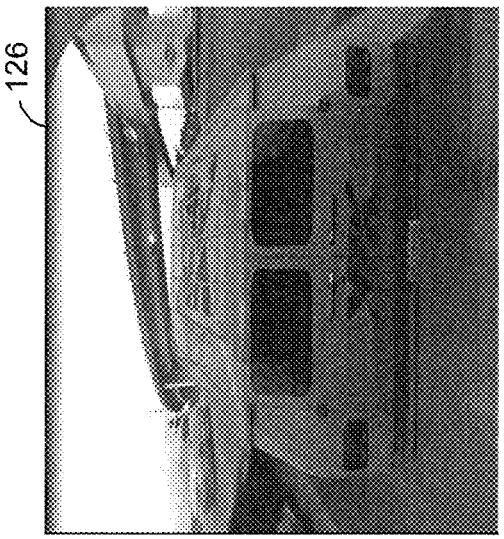
Figure 12B:
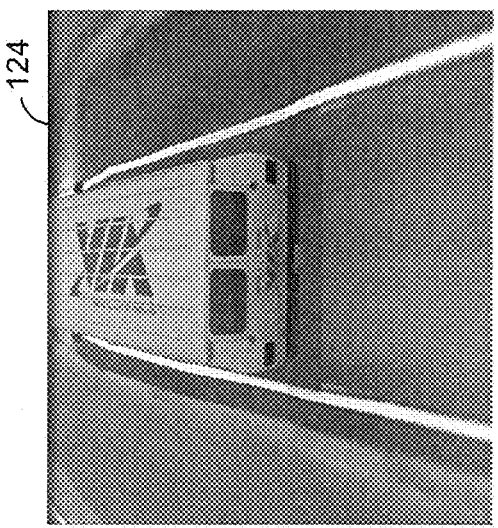
Figure 12A:
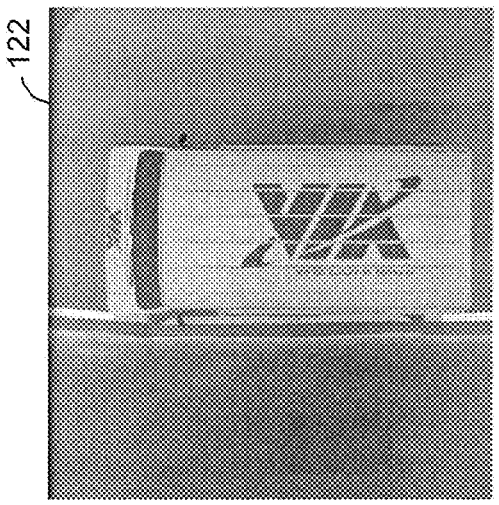

For example, FIG. 12A to FIG. 12G illustrate an example of displaying the images surrounding the vehicle according to an embodiment of the invention. In the present embodiment, a corresponding viewing angle may be manually selected by the user or automatically selected directly according to actuation parameters of the vehicle. FIG. 12A illustrates an image 122 of a top view; FIG. 12B illustrates an image 124 of the rear of the vehicle; FIG. 12C illustrates an image 126 viewed forward from the rear; FIG. 12D illustrates an image 128 viewed in a viewing angle from left-front to right-rear of the vehicle; FIG. 12E illustrates an image 130 viewed from right-front to left-rear of the vehicle; FIG. 12F illustrates an image 132 viewed from left-rear to right-front of the vehicle; and FIG. 12F illustrates an image 134 viewed from right-rear to left-front of the vehicle.

In summary, in the method and the apparatus for processing the surrounding images of the vehicle of the invention, a plurality of images surrounding the vehicle are captured in different views and transformed into the images of the top view, and an interval consisting of consecutive empty pixels in a longitudinal direction in the transformed images is found to determine a dividing line. The images are cropped, combined and stitched according to the dividing line, such that the adaptively processed synthetic image capable of clearly revealing the scenery surrounding the vehicle can be obtained. By mapping the synthetic image to the 3D model of the space surrounding the vehicle, the surrounding image of the vehicle can be automatically displayed according to the viewing demand.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A method for processing surrounding images of a vehicle, applicable to an electronic apparatus disposed on a vehicle, wherein the electronic apparatus is coupled to a plurality of cameras disposed on the vehicle, the method comprising:
    capturing images of a plurality of perspective views surrounding the vehicle by using the cameras;
    transforming each of the images from the perspective view into a top view;
    finding an interval consisting of at least a preset number of consecutive empty pixels from one column of pixels in each of the images of the top view, and dividing the images of the perspective views and the top view into floor side images and wall side images according to a height of the interval in the image; and
    stitching the divided floor side images and wall side images to generate a synthetic image surrounding the vehicle.

2. The method according to claim 1, wherein the cameras use fisheye lenses to capture the images, and the method further comprises:
    performing fisheye calibration on each of the images according to lens parameters of each of the fisheye lenses, and calibrating the image from a center of the image toward a peripheral of the image.

3. The method according to claim 2, further comprising:
    cropping each of the images according to the lens parameters of each of the fisheye lenses to move a center of the fisheye lens to the center of the image.

4. The method according to claim 1, wherein the step of transforming each of the images from the perspective view into the top view comprises:
    transforming positions of a plurality of pixels in the image of each of the perspective views into corresponding positions in the image of the top view through a transformation matrix.

5. The method according to claim 4, wherein before the step of transforming the positions of the pixels in the image of each of the perspective views into the corresponding positions in the image of the top view through the transformation matrix, the method further comprises:
    capturing a first image of the perspective view containing a reference object using each of the cameras;
    capturing a second image of the perspective view containing the reference object using a camera disposed above the reference object; and
    fetching positions of a plurality of pixels of the reference object in the first image to serve as destination positions, and fetching positions of a plurality of corresponding pixels of the reference object in the second image to serve as source positions, so as to solve the transformation matrix.

6. The method according to claim 1, wherein the step of stitching the divided floor side images and wall side images to generate the synthetic image surrounding the vehicle comprises:
    for the image of each of the perspective views and the image of the corresponding top view, combining the divided wall side image of the perspective view and the divided floor side image of the top view to generate a combined image of the perspective view; and
    stitching the combined images of the neighboring perspective views according to a plurality of corresponding features in the combined images to generate the synthetic image.

7. The method according to claim 6, wherein the step of stitching the divided floor side images and wall side images to generate the synthetic image surrounding the vehicle further comprises:

for the combined images of the neighboring perspective views, adjusting heights of the wall side images in the combined images to enable the heights of the wall side images in the combined images to be consistent.

8. The method according to claim 1, further comprising: respectively calibrating the wall side images to align objects in the calibrated wall side images with an axial direction of the wall side images.

9. The method according to claim 1, further comprising: mapping the synthetic image to a three-dimensional (3D) model of a space surrounding the vehicle; and receiving a viewing demand for the surrounding image of the vehicle, so as to provide the synthetic image in a viewing angle by using the 3D model according to the viewing angle contained in the viewing demand.

10. The method according to claim 9, wherein the step of receiving the viewing demand for the surrounding image of the vehicle, so as to provide the surrounding image in the viewing angle by using the 3D model according to the viewing angle contained in the viewing demand comprises:

receiving actuation parameters of the vehicle, accordingly determining the viewing angle corresponding to the actuation of the vehicle, and providing the surrounding image of the vehicle in the viewing angle by using the 3D model.

11. An apparatus for processing surrounding images of a vehicle, comprising:

a connection device, connecting to a plurality of cameras disposed on the vehicle;

a storage device, storing a plurality of modules; and a processor, coupled with the connection device and the storage device, loading and executing the modules in the storage device, wherein the modules comprise:

an image capturing module, capturing a plurality of images of perspective views surrounding the vehicle by using the cameras;

a view transformation module, transforming each of the images from the perspective view into a top view;

an image dividing module, finding an interval consisting of at least a preset number of consecutive empty pixels from one column of pixels in each of the transformed images of the top view, and dividing the images of the perspective views and the top view into floor side images and wall side images according to the height of the interval in the image; and an image stitching module, stitching the divided floor side images and wall side images to generate a synthetic image surrounding the vehicle.

12. The apparatus according to claim 11, wherein the cameras comprises fisheye lenses, and the modules further comprise:

a fisheye calibration module, performing fisheye calibration on each of the images according to lens parameters of each of the fisheye lenses, and calibrating the image from a center of the image toward a peripheral of the image.

13. The apparatus according to claim 12, wherein the fisheye calibration module further crops each of the images according to the lens parameters of each of the fisheye lenses to move a center of the fisheye lens to the center of the image.

14. The apparatus according to claim 11, wherein the view transformation module respectively transforms positions of a plurality of pixels in the image of each of the perspective views into corresponding positions in the image of the top view through a transformation matrix.

15. The apparatus according to claim 14, wherein the view transformation module captures a first image of the perspective view containing a reference object using each of the cameras, captures a second image of the perspective view containing the reference object using a camera disposed above the reference object, fetches positions of a plurality of pixels of the reference object in the first image to serve as destination positions, and fetches positions of a plurality of corresponding pixels of the reference object in the second image to serve as source positions, so as to solve the transformation matrix.

16. The apparatus according to claim 11, wherein for the image of each of the perspective views and the image of the corresponding top view, the image stitching module combines the divided wall side image of the perspective view and the divided floor side image of the top view to generate a combined image of the perspective view, and stitches the combined images of the neighboring perspective views according to a plurality of corresponding features in the combined images to generate the synthetic image surrounding the vehicle.

17. The apparatus according to claim 16, wherein for the combined images of the neighboring perspective views, the image stitching module further adjusts heights of the wall side images in the combined images of the neighboring perspective views to enable the heights of the wall side images in the combined images to be consistent.

18. The apparatus according to claim 11, wherein the image dividing module further respectively calibrates the wall side images to align objects in the calibrated wall side images with an axial direction of the wall side images.

19. The apparatus according to claim 11, wherein the modules further comprise:

a 3D model module, mapping the synthetic image to a 3D model of a space surrounding the vehicle, and receiving a viewing demand for the surrounding image of the vehicle, so as to provide the surrounding image of the vehicle in a viewing angle by using the 3D model according to the viewing angle contained in the viewing demand.

20. The apparatus according to claim 19, wherein the 3D model module receives actuation parameters of the vehicle, accordingly determines the viewing angle corresponding to the actuation of the vehicle and provides the surrounding image of the vehicle in the viewing angle by using the 3D model.

* * * * *